United States Patent
Huester et al.

(10) Patent No.: US 12,000,561 B2
(45) Date of Patent: Jun. 4, 2024

(54) HEADLIGHT ASSEMBLY AND ILLUMINATION METHOD FOR ILLUMINATING AN ENVIRONMENT OF A VEHICLE

(71) Applicant: HELLA GmbH & Co. KGaA, Lippstadt (DE)

(72) Inventors: Christian Huester, Salzkotten (DE); Boris Kubitza, Moehnesee-Koerbecke (DE); Martin Pluempe, Paderborn (DE); Udo Venker, Guetersloh (DE); Carsten Wilks, Lippstadt (DE)

(73) Assignee: Hella GmbH & Co. KGAA, Lippstadt (DE)

( * ) Notice: Subject to any disclaimer, the term of this patent is extended or adjusted under 35 U.S.C. 154(b) by 0 days.

(21) Appl. No.: 18/218,424

(22) Filed: Jul. 5, 2023

(65) Prior Publication Data
US 2023/0341103 A1 Oct. 26, 2023

Related U.S. Application Data

(63) Continuation of application No. PCT/EP2021/085453, filed on Dec. 13, 2021.

(30) Foreign Application Priority Data

Jan. 6, 2021 (DE) .................... 10 2021 100 092.0

(51) Int. Cl.
*F21S 45/10* (2018.01)
*F21S 41/65* (2018.01)

(52) U.S. Cl.
CPC .............. *F21S 45/10* (2018.01); *F21S 41/65* (2018.01)

(58) Field of Classification Search
CPC ................................. F21S 45/10; F21S 41/65
See application file for complete search history.

(56) References Cited

U.S. PATENT DOCUMENTS 9,884,582 B2 2/2018 Kato et al.
2008/0224634 A1 9/2008 Scilla
2017/0305328 A1* 10/2017 Kato ...................... H05B 45/56

FOREIGN PATENT DOCUMENTS

DE 10 2011 119 558 A1 5/2013
DE 10 2017 107 647 A1 10/2017
(Continued)

*Primary Examiner* — Anne M Hines
(74) *Attorney, Agent, or Firm* — Muncy, Geissler, Olds & Lowe, P.C.

(57) ABSTRACT

A headlamp assembly for illuminating surroundings of a vehicle, including at least one headlamp, a temperature sensor, and a control device. The at least one headlamp comprising a multiplicity of light sources, the multiplicity of light sources (being divided into a first group and at least one second group. The temperature sensor being configured to detect a temperature in the at least one headlamp. The light sources of the multiplicity of light sources being thermally coupled. The control device being configured to ascertain a current temperature ascertained by the temperature sensor in the at least one headlamp and, in the case that the current temperature in the at least one headlamp exceeds a predefined temperature threshold value, to select the first group or the at least one second group for a power reduction, depending on an operating situation of the vehicle and to reduce the power of the selected group.

9 Claims, 3 Drawing Sheets

(56) References Cited

FOREIGN PATENT DOCUMENTS

EP           1 874 097 A1    1/2008
EP           2 908 609 A1    8/2015

\* cited by examiner

HEADLIGHT ASSEMBLY AND ILLUMINATION METHOD FOR ILLUMINATING AN ENVIRONMENT OF A VEHICLE

This nonprovisional application is a continuation of International Application No. PCT/EP2021/085453, which was filed on Dec. 13, 2021, and which claims priority to German Patent Application No. 10 2021 100 092.0, which was filed in Germany on Jan. 6, 2021, and which are both herein incorporated by reference.

BACKGROUND OF THE INVENTION

Field of the Invention

The present invention relates to a headlamp assembly for illuminating surroundings of a vehicle, an illumination method, and a vehicle.

Description of the Background Art

High-resolution headlamps for vehicles comprise a multiplicity of light sources for illuminating surroundings of a vehicle.

Due to the thermal coupling of particular light sources of a headlamp, a temperature increase in the headlamp may occur during a continuous, joint activation of a multiplicity of light sources, which may possibly cause damage to the headlamp. Correspondingly, it is necessary to cool the headlamp in situations in which a temperature in the headlamp is above a critical threshold value to avoid damage to the headlamp.

So-called "derating methods" are known for cooling a headlamp, for example from EP 1 874 097 A1, which corresponds to US 2008/0224634, in which a light power of all light sources of the headlamp is reduced by decreasing a current supply, so that a thermal output emitted by the light sources is reduced in proportion to the light power, and the headlamp is at least not further heated.

A light power of the headlamp is generally decreased by decreasing the light power of all light sources of a headlamp.

SUMMARY OF THE INVENTION

It is therefore an object of the present invention to provide a continuous operation of a headlamp of a vehicle with an illumination quality that is comfortable for a user.

According to a first aspect of the presented invention, a headlamp assembly is presented for illuminating surroundings of a vehicle. The headlamp assembly comprises at least one headlamp, a temperature sensor, and a control device, the at least one headlamp comprising a multiplicity of light sources.

The multiplicity of light sources are divided into a first group and at least one second group.

The light sources of the multiplicity of light sources are thermally coupled.

The temperature sensor is configured to detect a temperature in the at least one headlamp.

The control device can be configured to ascertain a current temperature ascertained by the temperature sensor in the at least one headlamp and, in the case that the current temperature in the at least one headlamp exceeds a predefined temperature threshold value, to select the first group or the at least one second group for a power reduction, depending on an operating situation of the vehicle, and to reduce the power of the selected group.

In the context of the presented invention, a control device can be understood to be a computing unit, for example a processor, an ASIC, or any other programmable circuit. The control device provided according to the invention may comprise interfaces to the headlamp provided according to the invention and the temperature sensor provided according to the invention for the purpose of exchanging communication signals, in particular control commands, with the headlamp and/or the temperature sensor.

In the context of the presented invention, an operating situation of a vehicle can be understood to be a state or an operating mode of the vehicle itself and/or a state of surroundings of the vehicle, for example a type of a roadway, a brightness of the surroundings, or a traffic driving around the vehicle.

The presented headlamp assembly is based on the principle that at least one group of light sources is selectively chosen for a derating from a multiplicity of groups of light sources, i.e., a reduction of a power, for example by reducing an electrical current supplied to the selected group, depending on an operating situation, for example a current operating situation and/or a future operating situation of the vehicle.

By selectively choosing a particular group of light sources for a derating, depending on the operating state, further groups of light sources of the headlamp provided according to the invention may be operated at a high power and with correspondingly high heat generation. In other words, the selected group of light sources is used for cooling or as a thermal buffer of the entire headlamp, in which thermal resources for further groups of light sources of the headlamp are provided and, as a result, a heating of the headlamp is prevented even when operating the further groups of light sources at a high power.

According to the invention, a particular group of light sources whose power is to be reduced is selected, depending on an operating situation of a particular vehicle. For example, a current setting of components of the vehicle, such as an engine, currently ascertained measured values, such as a current velocity or a current position of the vehicle on an digital map, may be evaluated for this purpose.

In particular, it may be provided, for example, that in the case that the vehicle is in an "autonomous convey driving" operating situation, in which the vehicle is at least partially automatically controlled within a convoy, a group of light sources configured for a far field illumination is selected or is to be selected for the purpose of reducing its power. Accordingly, the power of a group of light sources configured for a near field illumination may be left at full power, so that corresponding sensors used to automatically control the vehicle may operate under optimal conditions.

It may furthermore be provided that in the case that the vehicle is in a "gridlock driving" operating situation, in which the vehicle is controlled in a traffic jam, for example at a velocity below a predefined velocity threshold value, a thermal window, i.e. a temperature reserve for heating in a future operating situation, is created, in that the power of a group of light sources is reduced or remains reduced during the gridlock driving. In particular, the power of a group of light sources configured for far field illumination may be reduced for this purpose.

Alternatively, or additionally to a current operating situation, an operating situation of a particular vehicle to be expected in the future may be evaluated to select a particular group of light sources whose power is to be reduced.

A future operating situation may be determined, for example, based on a planned route, so that the particular group of light sources whose power is to be reduced may be proactively selected in an optimized manner with a view toward the operating situation to be expected in the future, in that, for example, a group of light sources is selected as the particular group of light sources whose power is to be reduced, which are to be rarely used or not at all on a road to be driven in the future, for example a near field illumination while driving on a highway.

It may be provided that the control device is configured to determine the operating situation of the vehicle with the aid of an assignment list, which assigns particular operating situations to at least one sensor value of the following list of sensor values: vehicle velocity, surroundings brightness, steering angle, vehicle position.

An assignment list, which may be stored, for example, in a memory of the control device or downloaded via an interface to a memory, such as a cloud server, assigns an operating situation to particular ascertained measured values or settings. Correspondingly, by using an assignment list, an operating situation of the vehicle may be inferred, based on measured values or settings ascertained by the control device, and a group of light sources may be correspondingly selected to reduce their power. The group of light sources may be predefined by a further assignment list, which assigns particular groups of light sources provided for reducing their power to particular operating situations.

It may be provided that particular assignment lists may be stored in an editable manner for a user in a memory, so that a user may specify the groups of light sources provided for reducing their power, depending on the operating situation, or exclude them from a reduction in their power.

It may furthermore be provided that the control device is configured to control the multiplicity of light sources in such a way that they generate an illumination zone which becomes narrower and brighter as the velocity increases and which becomes wider and darker as the velocity decreases.

To control the light sources of the headlamp provided according to the invention for the purpose of generating an illumination zone which becomes narrower and brighter, groups of light sources arranged on side edges of the headlamp may have their power selectively reduced, and groups of light sources flanked by the groups on the edge of the headlamp have their power increased or at least kept constant.

To control the light sources of the headlamp provided according to the invention for the purpose of generating an illumination zone which is wider and darker, groups of light sources arranged on an upper and/or lower edge of the headlamp may have their power selectively reduced.

It may furthermore be provided that, in the case that a steering angle is signaled to the control device which is greater than a predefined steering angle threshold value, the control device is configured to enable an increase in a power of selected light sources only if the current temperature in the headlamp is less than a curve temperature threshold value.

A thermal window, i.e., a temperature range within which a heating of the headlamp is possible without damaging the headlamp, may be provided with the aid of a curve temperature threshold value. Correspondingly, particular light sources of the headlamp may be operated at high power within the thermal window. For example, the thermal window may be several seconds long to facilitate driving through a curve at correspondingly high brightness. In other words, the curve temperature threshold value indicates a temperature at which the headlamp still has thermal reserves or may be subjected to thermal load without sustaining damage.

It may furthermore be provided that the control device is configured to select the curve temperature threshold value depending on a time for which the power of the selected light sources is to be increased, and the control device is configured to ascertain the time for which the power of the selected light sources is to be increased, based on a route of a most proximate curve according to a digital map.

To permit a headlamp to operate in a cornering light mode at high power, i.e., in particular with high light power, for the duration of driving through a curve, the curve temperature threshold value may be selected in such a way that the corresponding thermal window, in which the headlamp may heat up, is large enough to cover the duration of a cornering maneuver. Correspondingly, the curve temperature threshold value may be selected dynamically, depending on a route or a duration of a cornering maneuver according to a digital map.

Particular groups of light sources may, in particular, be selectively reduced in their power prior to a cornering maneuver for the purpose of cooling a particular headlamp below a particular curve temperature threshold value.

It may furthermore be provided that the control device is configured to determine the operating situation of the vehicle based on a topography of a route currently being driven by the vehicle and to ascertain the topography of the route currently being driven with the aid of a digital map and a current vehicle position.

By including a topography of a route currently being driven, such as a type of a road, a permitted maximum velocity, a curve radius, or any further characteristic of a route to be driven by a vehicle, a particular group of light sources whose power is to be reduced may be selected in such a way that a subjectively unchanged or only minimally changed illumination zone results for the user. Accordingly, a light pattern generated by a particular headlamp may be adapted to a current operating situation of the vehicle, in particular to a road currently being driven. For example, a list of criteria including control parameters, in particular including settings for a particular group of light sources to be selected whose power is to be reduced, for a particular road or road type, may be stored for this purpose, for example, in the control device provided according to the invention or in a memory which is communicatively connected to the control device.

It may furthermore be provided that the control device is configured to predict a future operating situation of the vehicle, based on a topography of a route currently being driven, and to select a reduction value for reducing the power in such a way that, by setting the reduction value, a temperature to be expected for the future operating situation in the at least one headlamp is below a prediction threshold value predefined for the future operating situation, the control device being configured to ascertain the temperature to be expected, based on a temperature model of the at least one headlamp.

With the aid of a temperature model of a headlamp which mathematically represents a thermal behavior of the headlamp, a thermal window for an operating point of the headlamp in the future may be provided at a current point in time, in that the headlamp is prepared for the operating point in the future, for example by reducing a power of a selected group of light sources. For this purpose, a prediction threshold value may be determined, which designates a temperature at which a sufficiently large thermal window for the operating point in the future or sufficiently high reserves for heating the headlamp is/are present.

If a current temperature of a particular headlamp is above a particular prediction threshold value, it may be provided that a function for activating or increasing a power of particular light sources is deactivated for a cornering maneuver.

It may furthermore be provided that the control device is configured to predict a future operating situation of the vehicle, based on a topography of a route currently being driven, and to deactivate a function for increasing the power of the first group or the at least one second group if, based on the current temperature of the at least one headlamp, a temperature to be expected for the future operating situation in the at least one headlamp is above a threshold value predefined for the future operating situation, the control device being configured to ascertain the temperature to be expected, based on a temperature model of the at least one headlamp.

To prevent a critical heating of a particular headlamp and a possible damage to the headlamp caused thereby, a function for increasing a power of particular light sources may be reversibly deactivated, depending on a current temperature and a temperature to be expected. For example, when driving with an additional far field illumination (high-beam), situations may arise, in which a corresponding headlamp heats up to the extent that an additional activation of a cornering light could result in thermal damage to the headlamp. It may be provided that the control device provided according to the invention deactivates a function for activating the cornering light in situations of this type.

It may furthermore be provided that the first group and the at least one second group are arranged on circuit boards spaced a distance apart, the first group forming a first high-resolution illumination unit and the at least one second group forming at least one second high-resolution illumination unit.

High-resolution illumination units which comprise, for example, a multiplicity of individual light sources, such as light-emitting diodes (LEDs), in particular hundreds of individual LEDs which are arranged on a common circuit board or form a so-called "chip," are generally arranged as a thermally coupled system of multiple chips. Accordingly, chips of this type are especially suitable for reducing a power and for the corresponding regulation of a temperature of a headlamp as a complete thermally coupled system. A first group of light sources may be configured, for example, to illuminate a near fields, and a second group of light sources may be configured to illuminate a far field.

In a second aspect, the presented invention relates to an illumination method for illuminating surroundings of a vehicle with the aid of a possible embodiment of the presented headlamp assembly. The illumination method comprises a query step, in which a current temperature in at least one headlamp of the headlamp assembly is queried by a temperature sensor of the headlamp assembly and, in the case that the current temperature in the at least one headlamp exceeds a predefined threshold value, a power of a first group or at least one second group of light sources of the at least one headlamp is selectively reduced to lower the temperature in the at least one headlamp; a selection step, in which the first group or the at least one second group is selected, depending on an operating situation of the vehicle; and a setting step, in which a reduce power is set at the group selected in the selection step.

The presented illumination method is used, in particular, to operate the presented headlamp assembly. With the aid of the presented illumination method, a headlamp may be dynamically operated temporarily at a power which is above a thermal load suitable for a continuous operation so that a particularly high light power may be generated, for example during cornering maneuvers.

In a third aspect, the presented invention relates to a vehicle, which has a possible embodiment of the represented headlamp assembly.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
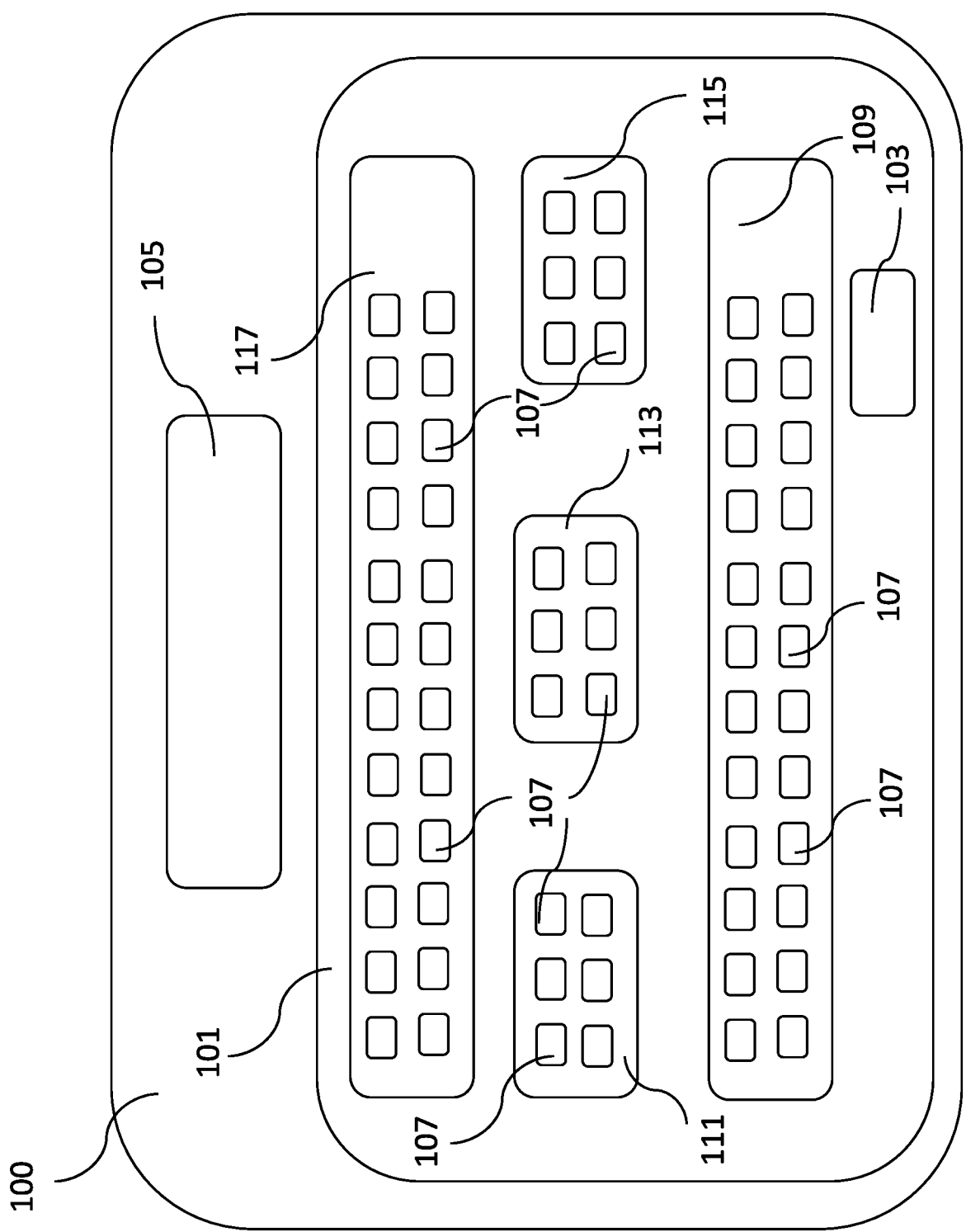
FIG. 1 shows a schematic representation of a possible embodiment of the presented headlamp assembly.

A headlamp assembly 100 is illustrated in FIG. 1. Headlamp assembly 100 comprises a headlamp 101, a temperature sensor 103, and a control device 105 and is part of a vehicle which is not illustrated here.

Headlamp 101 comprises a multiplicity of light sources 107, which are divided into a first group 109 for illuminating a front area, a second group 111, a third group 113, and fourth group 115 for standard illumination, and a fifth group 117 for illuminating a far field.

Temperature sensor 103 is configured to detect a temperature in headlamp 101. For this purpose, temperature sensor 103 may comprise, for example, a sensing element, which is positioned in an interior of headlamp 101 or, as illustrated here, is integrated completely within headlamp 101.

Light sources 107 of first group 109, second group 111, third group 113, fourth group 115, and fifth group 117 are thermally coupled, so that a temperature change at one particular group results in a temperature change of each of the other groups. For this purpose, light sources 107 of first group 109, second group 111, third group 113, fourth group 115, an fifth group 117 may be arranged, for example, on a common thermal conductive element, such as a metal plate.

Control device 105 is configured to ascertain a current temperature ascertained by temperature sensor 103 in headlamp 101 and, in the case that the current temperature in headlamp 101 exceeds a predefined threshold value, to select a particular group, whose power is to be reduced, from groups 109, 111, 113, 115, 117, depending on an operating situation of the vehicle.

Control device 105 is also configured to selectively reduce a power of the selected group.

For example, control device 105 may ascertain an operating situation of the vehicle, based on settings in a control unit of the vehicle, and select first group 109 for reducing its power, based on the operating situation or particular operation parameters currently set in the vehicle, and correspondingly reduce a supply of electrical current to first group 109, so that a light power of first group 109 is reduced and, as a result, the temperature of first group 109 and ultimately the temperature of overall headlamp 101 are reduced.

First group 109 may then be selected, for example, if a "velocity" operating parameter of the vehicle is above a predefined selection threshold value of, for example, 60 km/h, since a driver does not perceive a reduction in the near field illumination as a loss of comfort at velocities above 60 km/h.

Due to the reduction in the power of first group 109, second group 111, third group 113, fourth group 115, and possibly fifth group 117 may be operated at constant power without headlamp 101 heating up to a critical temperature range.

Figure 2:
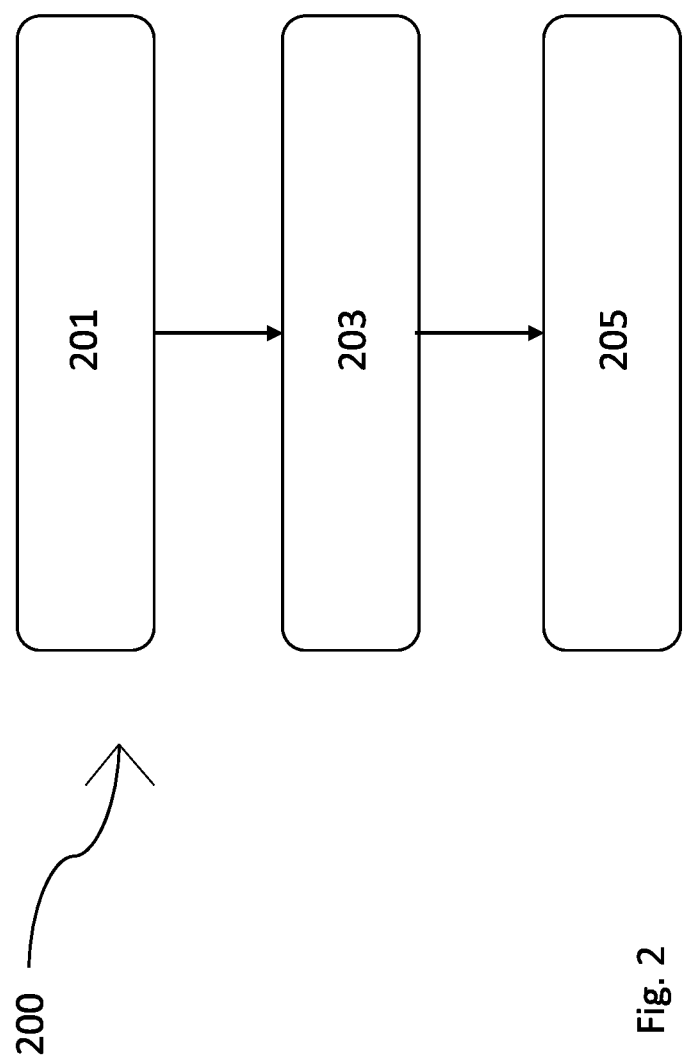
FIG. 2 shows a schematic representation of a possible embodiment of the presented illumination method.

An Illumination method 200 is illustrated in FIG. 2. Illumination method 200 comprises a query step 201, in which a current temperature ascertained by a temperature sensor of the headlamp assembly is queried in at least one headlamp of the headlamp assembly.

Illumination method 200 further comprises a selection step 203, in which, in the case that the current temperature in the at least one headlamp exceeds a predefined threshold value, the first group or the at least one second group is selected for power reduction, depending on an operating situation of the vehicle.

Illumination method 200 also comprises a setting step 205, in which a reduced power is set at the group selected in selection step 203.

In particular, a reduction value by which a power currently set at a group is reduced may be selected, depending on the current operating situation of the vehicle.

Figure 3:
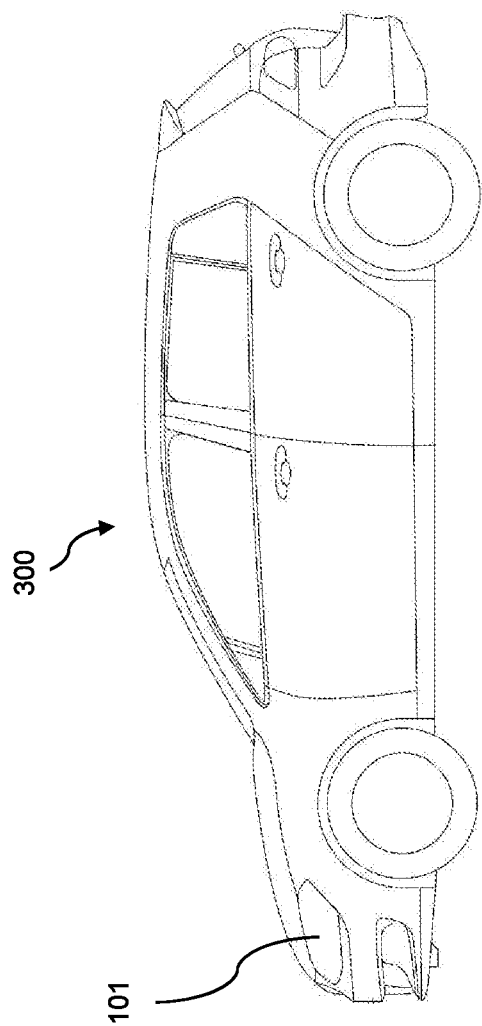
FIG. 3 shows a schematic representation of a possible embodiment of the presented vehicle.

A vehicle 300 is illustrated in FIG. 3. A headlamp assembly 100 according to FIG. 1 is arranged in vehicle 300, which may be operated according to an illumination method 200 according to FIG. 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A headlamp assembly for illuminating surroundings of a vehicle, the headlamp assembly comprising:
at least one headlamp comprising a plurality of light sources divided into a first group and at least one second group, the plurality of light sources being thermally coupled;
a temperature sensor configured to detect a temperature in the at least one headlamp; and
a control device configured to ascertain a current temperature ascertained by the temperature sensor in the at least one headlamp, and, when the current temperature in the at least one headlamp exceeds a predefined temperature threshold value, to select the first group or the at least one second group for a power reduction, depending on an operating situation of the vehicle, and to reduce the power of the selected group,
wherein the control device is configured to determine the operating situation of the vehicle with the aid of an assignment list, which assigns particular operating situations to at least one sensor value of a list of sensor values including: vehicle velocity, surroundings brightness, steering angle, and/or vehicle position, and
wherein, when the steering angle is signaled to the control device, and the steering angle is greater than a predefined steering angle threshold value, the control device is configured to enable an increase in a power of selected groups only if the current temperature in the headlamp is less than a curve temperature threshold value.

2. The headlamp assembly according to claim 1, wherein the control device is configured to control the first group and the at least one second group to generate an illumination zone which becomes narrower and brighter as the vehicle velocity increases and becomes wider and darker as the vehicle velocity decreases.

3. The headlamp assembly according to claim 1, wherein the control device is configured to select the curve temperature threshold value depending on a time for which the power of the selected groups is to be increased, the control device being configured to ascertain the time for which the power of the selected groups is to be increased based on a route of a most proximate curve according to a digital map.

4. The headlamp assembly according to claim 1, wherein the first group and the at least one second group are arranged on circuit boards spaced a distance apart, the first group forming a first high-resolution illumination unit, and the at least one second group forming at least one second high-resolution illumination unit.

5. An illumination method for illuminating surroundings of a vehicle with the headlamp assembly according to claim 1, the illumination method comprising:
performing a query step, in which a current temperature ascertained by a temperature sensor of the headlamp assembly in at least one headlamp of the headlamp assembly is queried;
performing a selection step, in which, in the case that the current temperature in the at least one headlamp exceeds a predefined threshold value, the first group or the at least one second group is selected for power reduction, depending on an operating situation of the vehicle; and
performing a setting step, in which a reduced power is set at the group selected in the selection step.

6. A vehicle comprising a headlamp assembly according to claim 1.

7. A headlamp assembly for illuminating surroundings of a vehicle, the headlamp assembly comprising:
at least one headlamp comprising a plurality of light sources divided into a first group and at least one second group, the plurality of light sources being thermally coupled;
a temperature sensor configured to detect a temperature in the at least one headlamp; and
a control device configured to ascertain a current temperature ascertained by the temperature sensor in the at least one headlamp, and, when the current temperature in the at least one headlamp exceeds a predefined temperature threshold value, to select the first group or the at least one second group for a power reduction, depending on an operating situation of the vehicle, and to reduce the power of the selected group,
wherein the control device is configured to determine the operating situation of the vehicle based on a topography of a route currently being driven by the vehicle, and wherein the control device ascertains the topography of the route currently being driven with the aid of a digital map and a current vehicle position.

8. The headlamp assembly according to claim 7, wherein the control device is configured to predict a future operating situation of the vehicle based on the topography of the route currently being driven, and to select a reduction value by which the power of the selected group is to be reduced in a way that, by setting the reduction value, a temperature to be expected for the future operating situation in the at least one headlamp is below a prediction threshold value predefined for the future operating situation, the control device being configured to ascertain the temperature to be expected, based on a temperature model of the at least one headlamp.

9. The headlamp assembly according to claim 7, wherein the control device is configured to predict a future operating situation of the vehicle based on the topography of the route currently being driven and to deactivate a function to increase the power of the first group or the at least one second group if, based on the current temperature of the at least one headlamp, a temperature to be expected for the future operating situation in the at least one headlamp is above a temperature threshold value predefined for the future operating situation, the control device being configured to ascertain the temperature to be expected, based on a temperature model of the at least one headlamp.

* * * * *